(12) United States Patent
Hirao et al.

(10) Patent No.: US 11,788,991 B2
(45) Date of Patent: Oct. 17, 2023

(54) ACOUSTIC INSPECTION METHOD, ACOUSTIC INSPECTION DEVICE, AND COUPLANT

(71) Applicant: KABUSHIKI KAISHA TOSHIBA, Tokyo (JP)

(72) Inventors: Akiko Hirao, Kawasaki (JP); Noriko Yamamoto, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 325 days.

(21) Appl. No.: 17/012,329

(22) Filed: Sep. 4, 2020

(65) Prior Publication Data
US 2021/0123890 A1    Apr. 29, 2021

(30) Foreign Application Priority Data
Oct. 25, 2019 (JP) .................. 2019-194490

(51) Int. Cl.
*G01N 29/28* (2006.01)
*G01N 29/24* (2006.01)
*G01N 29/04* (2006.01)

(52) U.S. Cl.
CPC ............ *G01N 29/28* (2013.01); *G01N 29/04* (2013.01); *G01N 29/2437* (2013.01); *G01N 2291/0289* (2013.01); *G01N 2291/044* (2013.01)

(58) Field of Classification Search
CPC .. G01N 29/28; G01N 29/2437; G01N 29/043; G01N 29/265; G01N 2291/0289
See application file for complete search history.

(56) References Cited

U.S. PATENT DOCUMENTS

| 3,564,303 | A | * | 2/1971 | Geil | H04R 1/44 |
| | | | | | 310/330 |
| 3,663,842 | A | * | 5/1972 | Miller | G10K 11/002 |
| | | | | | 73/644 |
| 3,741,003 | A | * | 6/1973 | Gunkel | G01N 29/07 |
| | | | | | 73/644 |
| 6,298,727 | B1 | * | 10/2001 | Fleming | G01N 29/22 |
| | | | | | 73/644 |
| 2020/0054305 | A1 | | 2/2020 | Niino et al. | |

FOREIGN PATENT DOCUMENTS

| JP | 2002-181796 A | 6/2002 |
| JP | 2008-089317 A | 4/2008 |
| JP | 2009284933 A | * 12/2009 |
| JP | 2017-019644 A | 1/2017 |
| JP | 2018-191882 A | 12/2018 |

* cited by examiner

*Primary Examiner* — Tarun Sinha
(74) *Attorney, Agent, or Firm* — Oblon, McClelland, Maier & Neustadt, L.L.P.

(57) ABSTRACT

An acoustic inspection device according to an embodiment has: an acoustic transducer including a piezoelectric element having at least one of functions of transmitting and receiving acoustic waves, and having an acoustic function surface functioning as at least one of a transmitting surface and a receiving surface of acoustic waves; a couplant, which is provided directly or with an intermediate member therebetween on the acoustic function surface of the acoustic transducer and contains at least an elastomer, having a contact surface to be in contact with an inspection target and an uneven structure provided on the contact surface; and a loading mechanism which applies and removes a load to/from the couplant.

12 Claims, 8 Drawing Sheets

ACOUSTIC INSPECTION METHOD, ACOUSTIC INSPECTION DEVICE, AND COUPLANT

FIELD

Embodiments described herein generally relate to an acoustic inspection method, an acoustic inspection device, and a couplant.

BACKGROUND

Acoustic inspection devices that use sonic wave propagation, such as acoustic waves and elastic waves, can be used to inspect various members, equipment, infrastructure, and so on. The acoustic inspection device is also used for medical diagnosis and the like. In the case of installing a probe for acoustic inspection such as an ultrasonic receiver, an ultrasonic transmitter, and an ultrasonic transmitter-receiver represented by an ultrasonic transducer, an AE (acoustic emission) sensor, and the like used for the inspection device on an inspection target, a couplant in a liquid form or viscous-body form such as glycerin, vaseline is interposed between an acoustic function surface functioning as at least one of a transmitting surface and a receiving surface for acoustic waves of the acoustic transducer and the inspection target in order to efficiently perform acoustic wave propagation with the inspection target.

The above-described couplant is important for efficient transmission of acoustic waves such as ultrasonic waves from the ultrasonic transducer to the inspection target or from the inspection target to the ultrasonic transducer to enhance test accuracy. However, processes of applying and removing the liquid or viscous-body couplant are troublesome. This has led to an increase in time and the number of processes for inspection. Some inspection targets, which are to be inspected may be contaminated by the couplant, in which case the inspection itself cannot be carried out.

A solid couplant has also been proposed, but the acoustic wave propagation is largely inferior to the case of using the liquid couplant. This may be due to the fact that air with a large difference in acoustic impedance intervenes between an installation surface of the couplant for the inspection target, such as the ultrasonic transmitter-receiver (transducer) and the ultrasonic receiver, and the inspection target. To prevent the air from intervening between the installation surface of the couplant for the acoustic inspection and the inspection target, a solid couplant with viscosity has also been proposed. However, in this case, the installation surface of the couplant for the acoustic inspection comes into close contact with the inspection target, failing to slide the couplant for the acoustic inspection. Therefore, even in the case of moving an installation position by a small distance, it is necessary to detach once the couplant together with the probe from the inspection target.

DETAILED DESCRIPTION

A problem to be solved by the present embodiments is to provide an acoustic inspection method, an acoustic inspection device, and a couplant that enable the couplant to be in close contact with an inspection target at the time of inspection and that enable the couplant to be easily moved over the inspection target without any need for application and removal of the couplant.

An acoustic inspection method according to an embodiment comprises: a step of bringing a contact surface with an uneven structure of a couplant, which is provided directly or with an intermediate member therebetween on an acoustic function surface functioning as at least one of a transmitting surface and a receiving surface of acoustic waves of an acoustic transducer, which includes a piezoelectric element having at least one of functions of transmitting and receiving acoustic waves, into contact with an inspection target, the couplant containing at least an elastomer; a step of applying a load to the couplant and pressing the uneven structure against the inspection target; and a step of performing a nondestructive inspection of the inspection target by means of acoustic waves under a state where the uneven structure is pressed against the inspection target.

An acoustic inspection device according to an embodiment comprises: an acoustic probe which includes a piezoelectric element having at least one of functions of transmitting and receiving acoustic waves and has an acoustic function surface functioning as at least one of a transmitting surface and a receiving surface of acoustic waves; a couplant, which is provided directly or with an intermediate member therebetween on the acoustic function surface of the acoustic probe and contains at least an elastomer, having a contact surface to be in contact with an inspection target and an uneven structure provided on the contact surface; and a loading mechanism which applies and removes a load to the couplant.

A couplant according to an embodiment contains at least an elastomer, and comprises: a contact surface to be in contact with an inspection target; and an uneven structure provided on the contact surface.

An acoustic inspection method, an acoustic inspection device, and a couplant for an acoustic inspection in embodiments will be described hereinafter with reference to the drawings. Note that substantially the same components are denoted by the same reference symbols, and description thereof may be partially omitted in some cases in the embodiments. The drawings are schematic, and the relation between thicknesses and plane dimensions of parts, ratios of the thicknesses of the parts, and the like may differ from actual ones. The terms indicating upper and lower directions in the description indicate relative directions with an inspection surface of an inspection target up and may differ from actual directions based on the direction of gravity.

Figure 1:
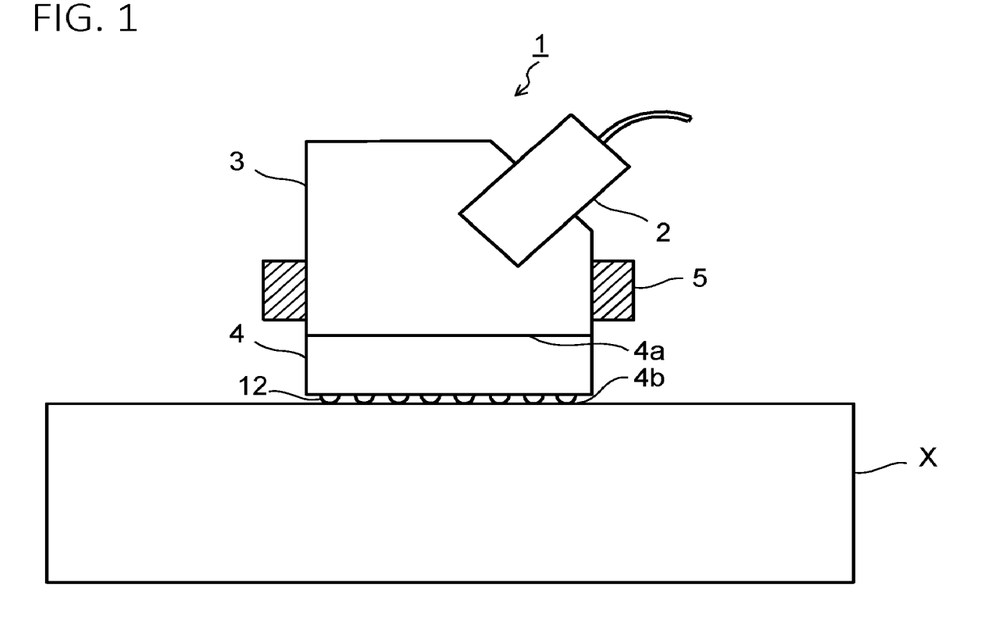
FIG. 1 is a cross-sectional view illustrating an acoustic inspection device of an embodiment.

FIG. 1 is a cross-sectional view illustrating an acoustic inspection device of an embodiment. An acoustic inspection device 1 illustrated in FIG. 1 includes an acoustic transducer 2. The acoustic transducer 2 has at least one of functions of transmitting and receiving acoustic waves, and for example, an acoustic transmitter-receiver (transducer) and an acoustic receiver can be cited. Representative examples of the acoustic transmitter-receiver include an ultrasonic transducer or an ultrasonic flaw detector. A representative example of the acoustic receiver includes an AE sensor. The acoustic transducer 2 may be an ultrasonic transmitter. The acoustic wave described herein is a generic name of all elastic vibration waves propagated through an elastic body regardless of gas, liquid, or solid, and includes not only sonic waves in an audible frequency range but also ultrasonic waves having a frequency higher than the audible frequency range and low-frequency sounds having a frequency lower than the audible frequency range, and so on. The frequency of the sonic wave is not particularly limited but includes a high frequency to a low frequency.

In the acoustic inspection device 1 of this embodiment, the acoustic transducer 2 having at least one of the functions of transmitting and receiving acoustic waves is mounted on a shoe (intermediate member) 3 made of a polymeric material. The acoustic transducer 2 has a transmitting-receiving surface, a receiving surface, a transmitting surface, and/or the like of acoustic waves. Here, a surface of the acoustic probe 2 functioning as at least one of the transmitting surface and the receiving surface of acoustic waves is called an acoustic function surface. The shoe 3 is in contact with the acoustic function surface of the acoustic transducer 2, and a couplant 4, which functions as an acoustic propagation unit is provided at an outer peripheral surface, which functions as at least one of a transmitting surface and a receiving surface of acoustic waves of the shoe 3. The acoustic inspection device 1 is arranged so that the couplant 4 is in contact with an inspection target (processing target) X. The acoustic inspection device 1 can be used in, for example, a pulse reflection method, and a nondestructive inspection of flaws and the like in the inspection target X is performed by measuring acoustic waves from the inspection target X.

The acoustic inspection device 1 further includes a load-applying fixture 5 provided on an outer periphery of the shoe 3. In the acoustic inspection device 1, a load is first applied to the shoe 3 on which the acoustic transducer 2 is mounted through the load-applying fixture 5, and then the load is applied to the couplant 4 through the shoe 3. This allows acoustic waves to propagate efficiently between the couplant 4 and the inspection target X, allowing for accurate nondestructive inspection of the inspection target X. Further, the couplant 4 of the acoustic inspection device 1 can slide over the inspection target X by removing the load applied to the shoe 3 by the load-applying fixture 5. This allows the acoustic inspection device 1 to be moved to the next inspection position of the inspection target X. The load can be applied to the couplant 4 by various mechanisms and methods of applying force to the couplant 4. For example, the load can be applied to the couplant 4 by means of an electromotive actuator using a stepping motor or an AC servomotor, an actuator using hydraulic or pneumatic pressure, or the like.

Figure 2:
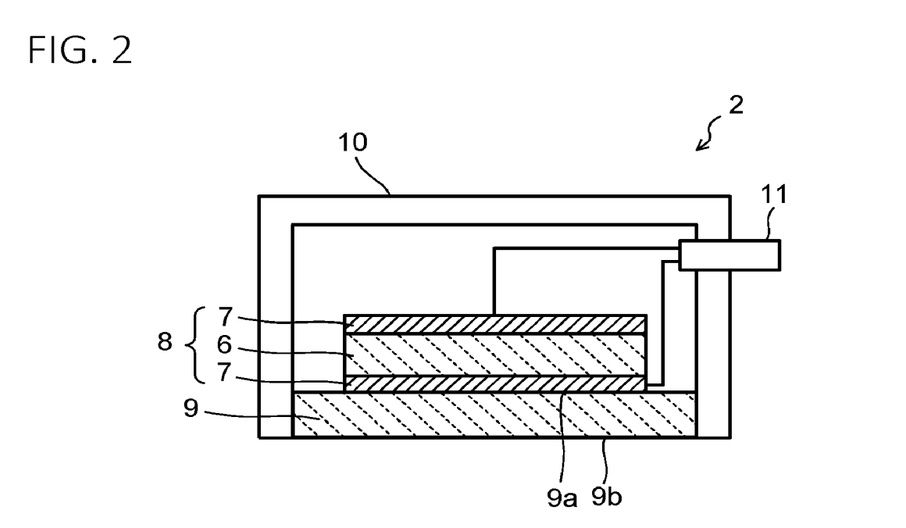
FIG. 2 is a cross-sectional view illustrating an acoustic probe in the acoustic inspection device illustrated in FIG. 1.

In the acoustic inspection device 1 illustrated in FIG. 1, the acoustic probe 2 is an ultrasonic probe as, for example, the ultrasonic transmitter-receiver. An acoustic transducer 2 includes an ultrasonic transmitting-receiving element 8 having a piezoelectric element 6 for ultrasonic flaw detection, and electrodes 7 provided on upper and lower both surfaces of the piezoelectric element 6. The ultrasonic transmitting-receiving element 8 is disposed on a wave receiving plate 9 and is housed in a case 10 in this state. The electrodes 7 of the ultrasonic transmitting-receiving element 8 are electrically connected to a connector 11 provided at the case 10. Composing materials, structures, and so on used for a well-known ultrasonic probe can be applied to the piezoelectric element 6, the ultrasonic transmitting-receiving element 8, the wave receiving plate 9, and so on, and these are not particularly limited. When the acoustic probe 2 is an acoustic receiver such as an AE sensor, a configuration similar to the ultrasonic transducer is applied except that an ultrasonic receiving element 8 having the piezoelectric element 6 for receiving acoustic emission is used. In this case, composing materials, structures, and so on used for a well-known AE sensor can be applied to the piezoelectric element 6 for receiving acoustic emission, the acoustic receiving element 8, the wave receiving plate 9, and so on.

When the acoustic probe is applied as the ultrasonic transducer 2, ultrasonic waves are transmitted through the wave receiving plate 9, and reflected waves of the ultrasonic waves are received through the wave receiving plate 9, by applying a voltage from the electrodes 7 to the piezoelectric element 6. In the acoustic transducer 2, a surface 9b opposite to a surface 9a, which is in contact with the ultrasonic transmitting-receiving element 8 of the wave receiving plate 9, becomes a transmitting surface and a receiving surface (transmitting-receiving surface) for acoustic waves. When the AE sensor is applied as the acoustic transducer 2, the piezoelectric element 6 receives acoustic waves (elastic waves) caused by acoustic emission (AE) in the inspection target through the wave receiving plate 9. In the AE sensor 2, the surface 9b opposite to the surface 9a, which is in contact with the acoustic receiving element 8 of the wave receiving plate 9, becomes a receiving surface for the acoustic waves. In the acoustic transducer 2, the surface 9b of the wave receiving plate 9 opposite to the surface 9a, which is in contact with the acoustic transmitting-receiving element or the acoustic receiving element (hereinafter, collectively denoted as an ultrasonic element in some cases) 8 where the ultrasonic element 8 is disposed, becomes the ultrasonic function surface functioning as at least one of the transmitting surface and the receiving surface of ultrasonic waves.

In the acoustic inspection device 1 illustrated in FIG. 1, the couplant 4 is provided on the acoustic function surface 9b functioning as at least one of the transmitting surface and the receiving surface of acoustic waves of the acoustic element 8 including the piezoelectric element 6 with the shoe 3 therebetween, and fixed to the shoe 3 with, for example, a non-illustrated adhesive layer therebetween. As illustrated in FIG. 1, the acoustic inspection device 1 is disposed on the inspection target X such that an outer surface of the couplant 4 is in contact with the inspection target X. In the couplant 4, a surface 4b opposite to a fixed surface 4a to the shoe 3 forms a contact surface with the inspection target X. An uneven structure 12 is provided on the contact surface 4b of the couplant 4 with the inspection target X. When the acoustic transducer is applied as the ultrasonic probe 2, ultrasonic waves transmitted from the ultrasonic transmitting-receiving element 8 are propagated to the inspection target X through the wave receiving plate 9, the shoe 3, and the couplant 4, and reflected waves reflected by the inspection target X are propagated to the ultrasonic transmitting-receiving element 8 through the couplant 4, the shoe 3, and the wave receiving plate 9. When the AE sensor is applied as the acoustic transducer 2, acoustic waves (elastic waves) generated in the inspection target are propagated to the acoustic receiving element 8 through the couplant 4, the shoe 3, and the wave receiving plate 9.

Figure 3:
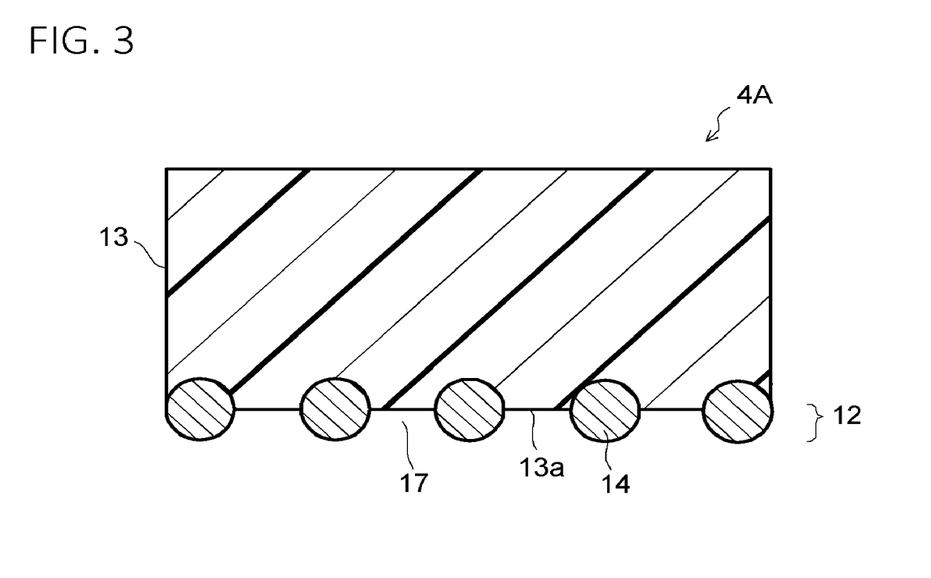
FIG. 3 is a cross-sectional view illustrating a first example of a couplant in the acoustic inspection device illustrated in FIG. 1.
Figure 4:
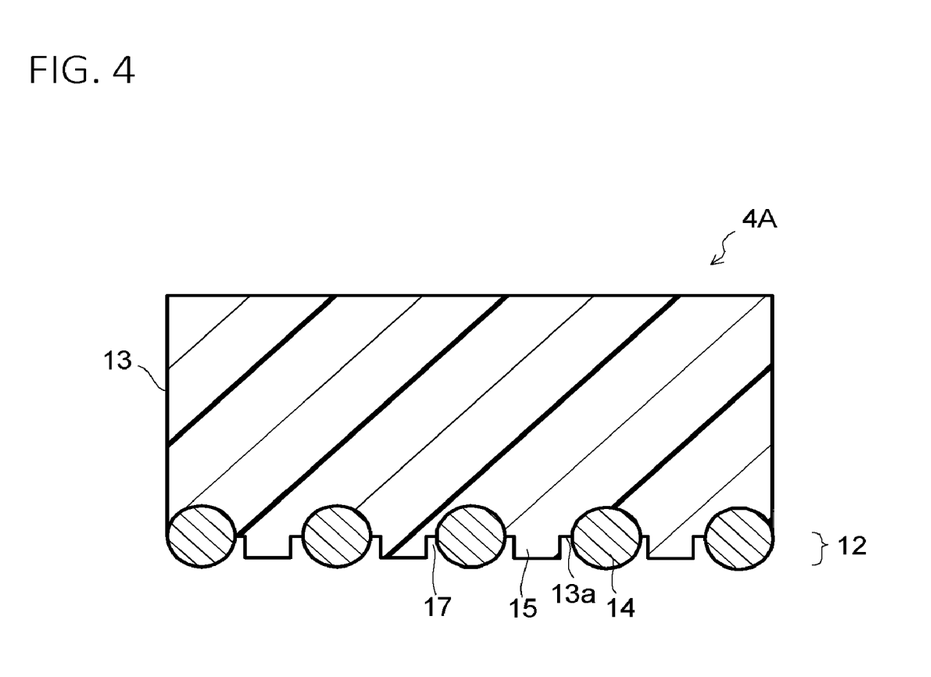
FIG. 4 is a cross-sectional view illustrating a second example of the couplant in the acoustic inspection device illustrated in FIG. 1.
Figure 5:
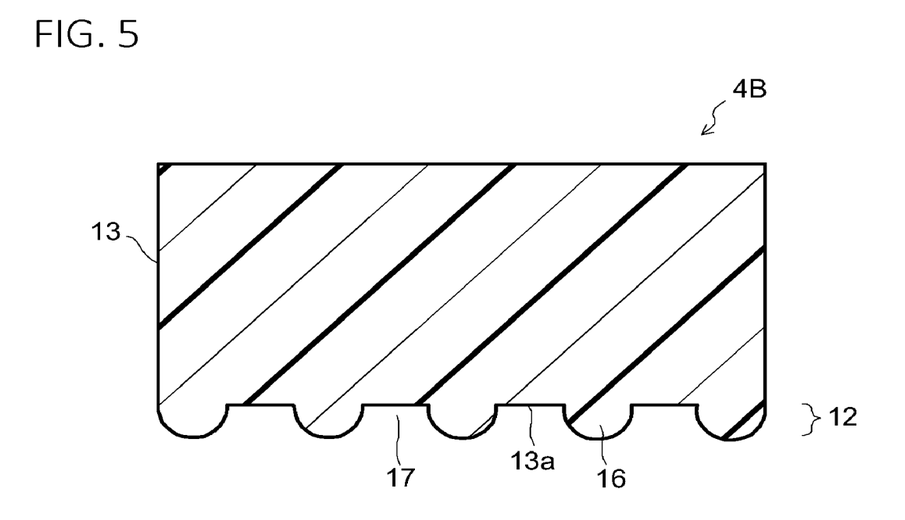
FIG. 5 is a cross-sectional view illustrating a third example of the couplant in the acoustic inspection device illustrated in FIG. 1.
Figure 6:
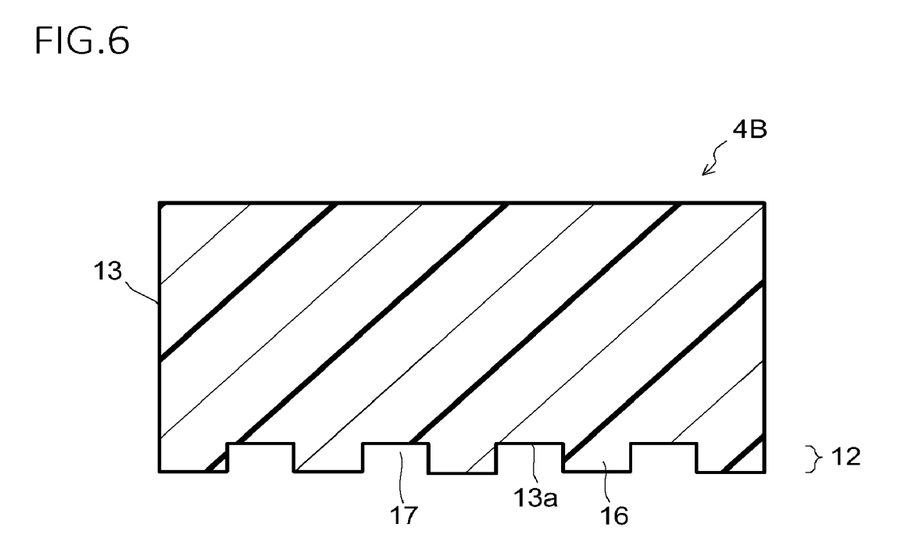
FIG. 6 is a cross-sectional view illustrating a fourth example of the couplant in the acoustic inspection device illustrated in FIG. 1.

The couplant 4 contains at least an elastomer, and has the contact surface 4b to be in contact with the inspection target X as described above and the uneven structure 12 provided on the contact surface 4b. A first concrete example of the couplant 4 includes a couplant 4A having a couplant body 13 containing at least the elastomer, and protruding members 14 provided on a surface 13a of the couplant body 13 so as to form the uneven structure 12 on the contact surface 4b of the couplant 4, as illustrated in FIG. 3 and FIG. 4, for example. FIG. 3 illustrates a configuration where only the protruding members 14 are provided on the surface 13a of the couplant body 13, and FIG. 4 illustrates a configuration where the protruding members 14 are provided on the surface 13a of the couplant body 13 and projecting bodies 15 are further provided between the protruding members 14. A second concrete example of the couplant 4 includes a couplant 4B having the couplant body 13 containing at least the elastomer and provided with protruding parts 16 formed by parts of the couplant body 13 on the surface 13a of the couplant body 13 so as to form the uneven structure 12 on the contact surface 4b of the couplant 4, as illustrated in FIG. 5 and FIG. 6, for example. FIG. 5 illustrates the protruding parts 16 each with a semi-circular cross-section, and FIG. 6 illustrates the protruding parts 16 each with a rectangular cross-section.

As mentioned above, acoustic waves can be efficiently propagated between the couplant 4 and the inspection target X when a load is applied, and the couplant 4 can be moved over the inspection target X when the load is removed, by using the couplant 4 containing at least the elastomer. These make it possible to improve both accuracy of the nondestructive inspection by the acoustic inspection device 1 and mobility of the acoustic inspection device 1. That is, the elastomer with viscosity can allow acoustic waves, such as ultrasonic waves, to transmit through the couplant in a similar way as a liquid couplant. This is thought to be due to deformation properties of the elastomer, that is, "ultra-low elastic modulus", "reversible large deformation", and "viscoelasticity".

When measuring frictional force of the elastomer, the frictional force of the elastomer is far larger than that of other materials, and coefficient of static friction over 1.0 may be observed in some cases. Origin of this large frictional force is due to adsorption force of the elastomer to the inspection target X, which is derived from Van der Waals force, chemical bonding, and so forth, and it is a phenomenon observed because a contact area becomes extremely large due to deformation. When hard materials such as metals are brought into contact with each other, only a very small part of contact surfaces, roughness, specifically tips of microprojections, will come into contact with each other. However, if an elastic modulus is low, such as in the case of the elastomer, the adsorption force increases in accordance with the contact area because the contact area increases even when the load is the same. The viscoelasticity of the elastomer acts in a direction of increasing force to tear off an adsorption interface on contact, which also increases a coefficient of friction. Thus, the elastomer is able to transmit acoustic waves well because an actual (microscopic) contact area with the inspection target X is large. However, the easier it is for acoustic waves to transmit through, the larger the frictional force and the harder it is to remove.

Figure 7A:
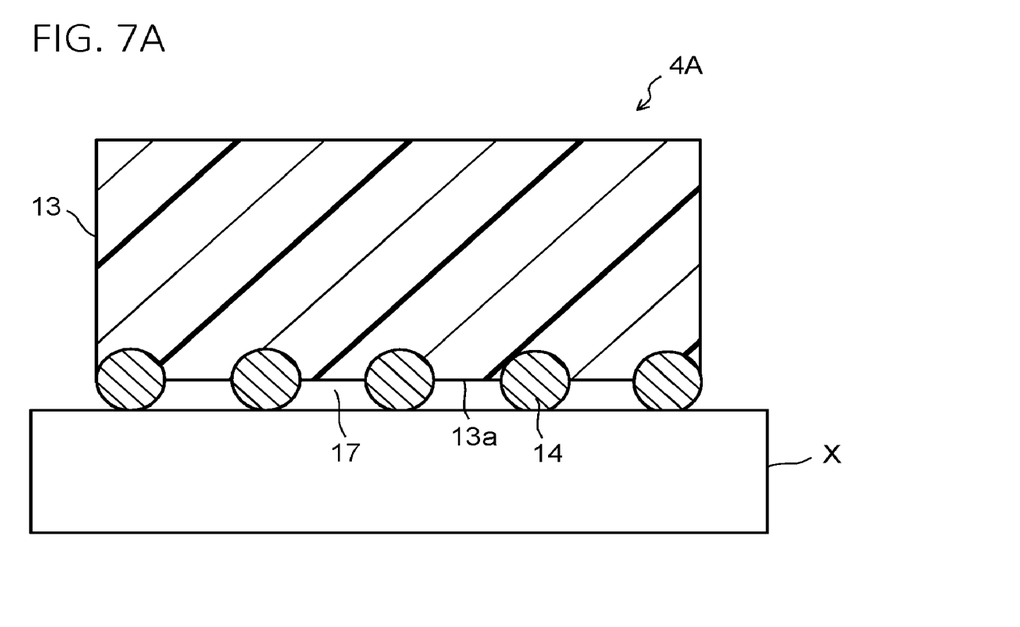
FIG. 7A is a cross-sectional view illustrating the couplant illustrated in FIG. 3 when the load is not applied.
Figure 7B:
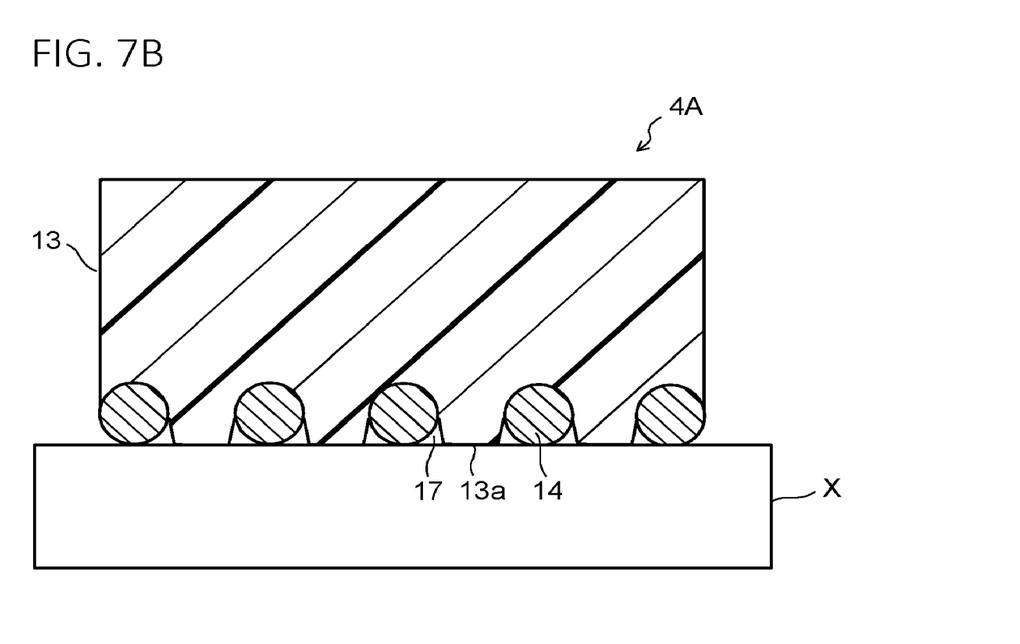
FIG. 7B is a cross-sectional view illustrating the couplant illustrated in FIG. 3 when the load is applied.

Therefore, the couplant 4A illustrated in FIG. 3 and FIG. 4 is provided with the protruding members 14 on the surface 13a of the couplant body 13. The protruding member 14 is formed of a material with a larger elastic modulus than the couplant body 13 containing the elastomer. As illustrated in FIG. 3 and FIG. 4, in the uneven structure 12 of the couplant 4A, a plurality of protruding members 14 provided on the surface 13a of the couplant body 13 form protruding parts, recessed parts 17 are formed between the protruding members (protruding parts) 14, and the couplant body 13 is present at a bottom of the recessed parts 17. According to the couplant 4A as stated above, when the load is not applied, the protruding members (protruding parts) 14 with the large elastic modulus are in contact with the inspection target X and the couplant body 13 containing the elastomer is not in contact with the inspection target X as illustrated in FIG. 7A, so it can be moved with small frictional force. When the load is applied, the couplant body 13 containing the elastomer deforms and protrudes between the protruding members (protruding parts) 14, as illustrated in FIG. 7B, causing the couplant body 13 to be in contact with the inspection target X. Thus, acoustic waves can be propagated efficiently.

Figure 8A:
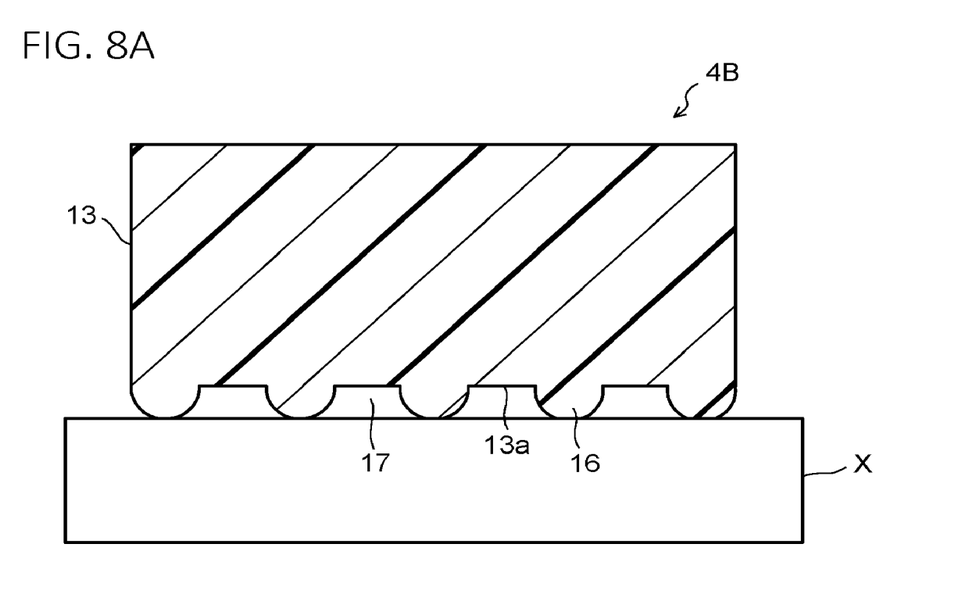
FIG. 8A is a cross-sectional view illustrating the couplant illustrated in FIG. 5 when the load is not applied.
Figure 8B:
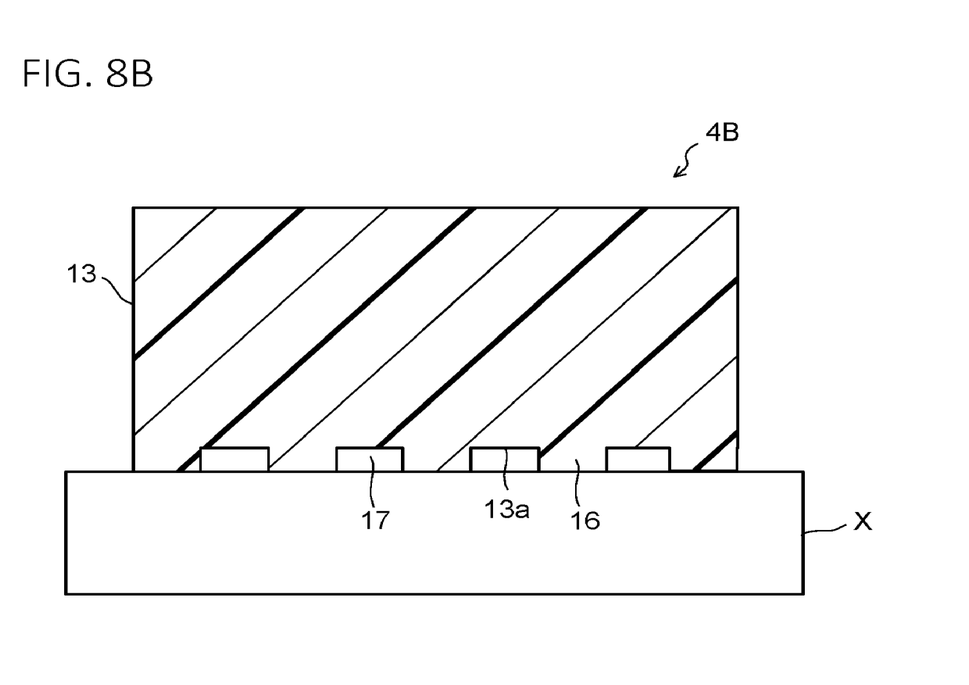
FIG. 8B is a cross-sectional view illustrating the couplant illustrated in FIG. 5 when the load is applied.

In the couplant 4B illustrated in FIG. 5 and FIG. 6, the protruding parts 16 formed of the couplant body 13 are provided on the surface 13a of the couplant body 13. As illustrated in FIG. 5 and FIG. 6, in the uneven structure 12 of the couplant 4B, the recessed parts 17 are present between the protruding parts 16 provided on the surface 13a of the couplant body 13. According to the couplant 4B as stated above, when the load is not applied, surfaces of the protruding parts 16 each with a small area are in contact with the inspection target X as illustrated in FIG. 8A, so it can be moved with small frictional force. When the load is applied, the protruding parts 16 formed of the couplant body 13 containing the elastomer deform and the couplant body 13 is in close contact with the inspection target X, as illustrated in FIG. 8B. Thus, acoustic waves can be propagated efficiently. The protruding part 16 preferably has a shape such as a semi-circle in cross-section, that is, a shape formed with a convex curved surface, so that the contact area with the inspection target X is small when no load is applied.

In the couplant 4A illustrated in FIG. 3 and FIG. 4 and the couplant 4B illustrated in FIG. 5 and FIG. 6, a size (minimum width) of each of the protruding parts 14, 16 is preferably 10 μm or more and 500 μm or less. If the minimum width of each of the protruding parts 14, 16 exceeds 500 μm, the effect of reducing the frictional force by bringing only the protruding parts 14, 16 into contact with the inspection target X, when no load is applied, may not be sufficiently obtained. If the minimum width of each of the protruding parts 14, 16 is less than 10 μm, it may not be possible to bring the couplant body 13 into sufficient contact with the inspection target X when the load is applied. A size (minimum width) of the recessed part 17 is preferably 10 μm or more and 500 μm or less. Even beyond this range, effects of reducing the frictional force and expanding the contact area with the inspection target X by the couplants 4A and 4B may not be sufficiently obtained.

Further, in the couplant 4A illustrated in FIG. 3 and FIG. 4, the total area (an area projected onto a plane) of the recessed parts 17 is preferably larger than the total area (an area projected onto a plane) of the protruding parts 14 when the surface 4b with the uneven structure 12 is viewed from a normal direction. In the couplant 4B illustrated in FIG. 5 and FIG. 6, the total area (an area projected onto a plane) of the protruding parts 16 is preferably larger than the total area (an area projected onto a plane) of the recessed parts 17 when the surface 4b with the uneven structure 12 is viewed from the normal direction. These can increase the efficiency of acoustic wave propagation between the couplant 4 and the inspection target X. The minimum width of each of the protruding parts 14, 16, the minimum width of the recessed part 17, a ratio of the total area of the protruding parts 14, 16 to the total area of the recessed parts 17, and the like are preferably selected as appropriate depending on the Young's modulus and acoustic impedance of a material used for the couplant body 13.

A thickness of each of the couplants 4A, 4B is preferably 10 μm or more and 10 mm or less. Suitable thicknesses vary depending on the acoustic impedance and the Young's modulus of materials that form the couplants 4A and 4B. Especially when the thickness is between about 0.5 mm or more and 2 mm or less, the acoustic wave propagation performance is high and lubricity on the inspection target X can also be increased. The elastomers contained in the composing materials of the couplants 4A and 4B include thermosetting elastomers and thermoplastic elastomers, where both of which can be used for the couplant 4 in this embodiment. The thermoplastic elastomer may be a copolymer of two or more polymers with different temperature dependency of the elastic modulus, for example. The elastomers used in the embodiment have predetermined viscoelasticity and can be attached to an object so that they do not contaminate surroundings as compared to other couplants such as water or oil, and since they are solid, they can be easily removed and reused. To eliminate an air layer by pressing the couplant 4, an elastic constant (Young's modulus) of the elastomer to be used is preferably 0.1 MPa or more and 0.1 GPa or less. Yield stress, which is the stress that initiates plasticity of a material, is preferably large to be 2 MPa or more, and more preferably 20 MPa or more. Tensile strength is also preferably large to be 2 MPa or more.

Examples of the thermoplastic elastomers that mainly form the couplants 4A and 4B include polystyrene-based thermoplastic elastomers (SBC, TPS), polyolefin-based thermoplastic elastomers (TPO), vinyl chloride-based thermoplastic elastomers (TPVC), polyurethane-based thermoplastic elastomers (TPU), polyester-based thermoplastic elastomers (TPEE, TPC), and polyamide-based thermoplastic elastomers, and so on. Examples of the thermosetting elastomers include: styrene-butadiene rubber (SBR), isoprene rubber (IR), butadiene rubber (BR), chloroprene rubber (CR), and acrylonitrile-butadiene rubber (NBR), which are classified as a diene-based rubber; butyl rubber such as isobutylene-isoprene rubber (IIR), ethylene-propylene rubber (EPM), ethylene-propylene-diene rubber (EPDM), urethane rubber (U), silicone rubber, fluorine rubber (FKM), which are classified as a non-diene-based rubber; and other rubbers such as chlorosulfonated polyethylene (CSM), chlorinated polyethylene (CM), acrylic rubber (ACM), polysulfide rubber (T), epichlorohydrin rubber (CO, ECO), and the like. Since each material has characteristics such as heat resistance, abrasion resistance, oil resistance, chemical resistance, and so on, it is preferable to select the material appropriately depending on an inspection object. A plurality of elastomers may be mixed together depending on the application. Additives with a size that does not interfere with the transmission of acoustic waves, that is, approximately 200 μm or less in diameter, may be mixed in.

The couplants 4A and 4B can be slid over the inspection target X by the protruding parts 14, 16 of the uneven structure 12 when no load is applied. This is because the material forming the protruding parts 14 is made of a harder material than the couplant body 13, or the protruding parts 16 have a shape having smaller contact areas with the inspection target X. The material forming the protruding parts 14 may be an elastomer-containing material forming the couplant body 13, or other materials such as metals, ceramics, and oxides may be used. Some elastomers can be modified by light irradiation or the like, and this phenomenon may be used to create the uneven structure. For example, when light containing the wavelength of 156 nm is irradiated on the silicone rubber, the light-irradiated parts of the silicone rubber will be modified into a material whose main component is $SiO_2$, and those parts protrude like humps. This can be used as the couplant 4A as it is.

The composing materials of the couplants 4A, 4B may contain a slide-ring elastomer. This is to reduce the Young's modulus of the elastomer and to reduce hysteresis. The slide-ring elastomer is a slide-ring polymeric material represented by a polyrotaxane structure, which is known to have a very low Young's modulus. Rotaxane is one where a rod-like molecule is threaded through macrocyclic molecules and a bulky site is bonded to both ends of an axle so that the rings cannot be dethreaded from the axle due to steric hindrance. Its structural features can be classified into three categories. That is, (1) no covalent bond exists between a cyclic molecule and a linear macromolecule, (2) a large number of cyclic molecules are able to rotate and slide along the linear macromolecule, and (3) functionalization of cyclic molecules in polyrotaxane by chemical modification is possible.

As the slide-ring elastomer described above, polyrotaxane with polyethylene glycol as the axle molecule, a cyclodextrin derivative as the cyclic molecule, and adamantane as a capping molecule in the raw material is suitable. In particular, the elastomer where polyrotaxane grafted with polycaprolactone or the like and other macromolecules are blended to be cross-linked has a very low elastic modulus of about 1 kPa. By using the above-mentioned elastomer as the composing material, following properties to the surface of the inspection target X having unevenness can be further enhanced. Further, hysteresis is also reduced, which can increase the number of continuous uses.

Figure 9:
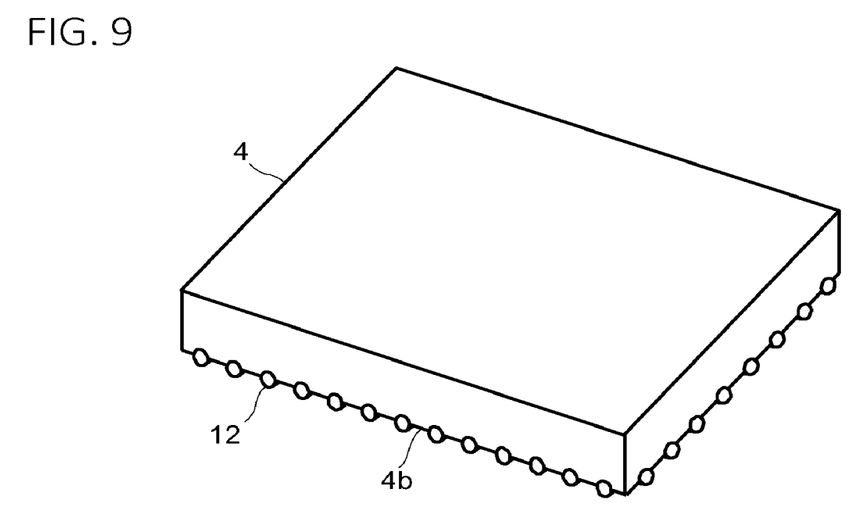
FIG. 9 is a perspective view of the couplant in the acoustic inspection device illustrated in FIG. 1.
Figure 10:
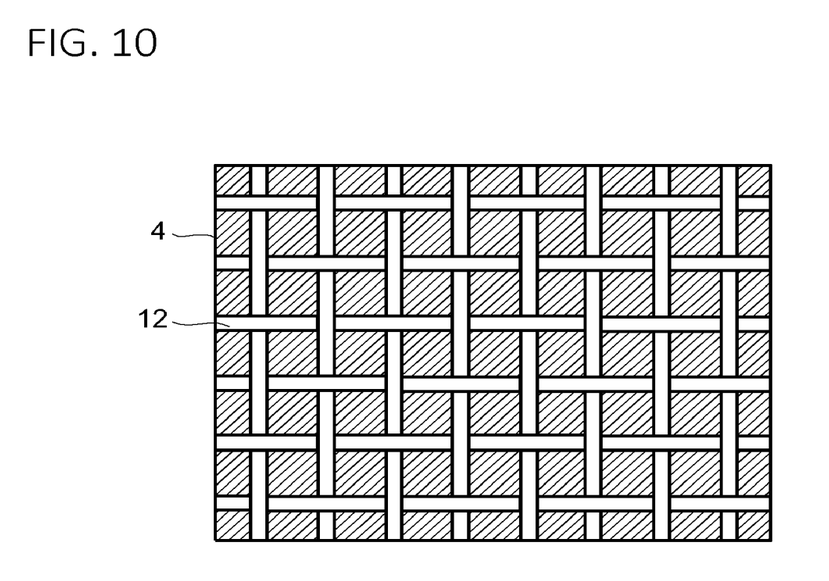
FIG. 10 is a lower view of the first example of the couplant illustrated in FIG. 9.
Figure 11:
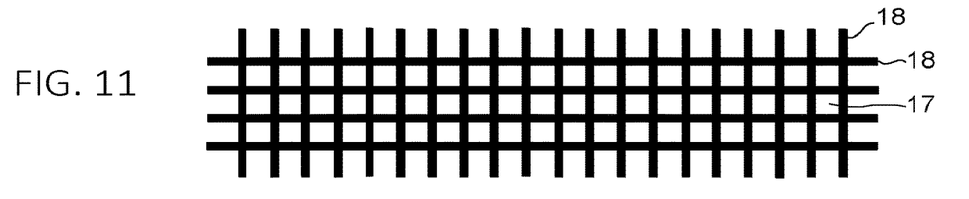
FIG. 11 is a view schematically illustrating a lower surface of the first example of the couplant illustrated in FIG. 9.

A planar shape of the uneven structure 12 of each of the couplants 4A and 4B is not particularly limited. For example, a planar shape with intersecting vertical and horizontal bar-shaped projections 18 is exemplified as illustrated in FIG. 9, FIG. 10, and FIG. 11. In the couplant 4A illustrated in FIG. 3 and FIG. 4, a member where vertical and horizontal bar-shaped protruding members 14 are woven into a mesh may be applied. In this case, the planar shape is also the intersecting vertical and horizontal bar-shaped projections 18 illustrated in FIG. 11. In FIG. 11, black-painted parts are the protruding parts 14, 16, and white-painted parts therebetween are the recessed parts 17. This is also the case in FIG. 12 through FIG. 15. The planar shapes of the protruding parts 14 illustrated in FIG. 3 and FIG. 4 and the protruding parts 16 illustrated in FIG. 5 and FIG. 6 can be applied to both the protruding parts 14 and the protruding parts 16 as viewed from the normal direction of the surface 4b of the couplant 4 with the uneven structure 12, although there is a difference in whether the protruding part is formed by the protruding members 14 or parts of the couplant body 13 itself.

Figure 12:
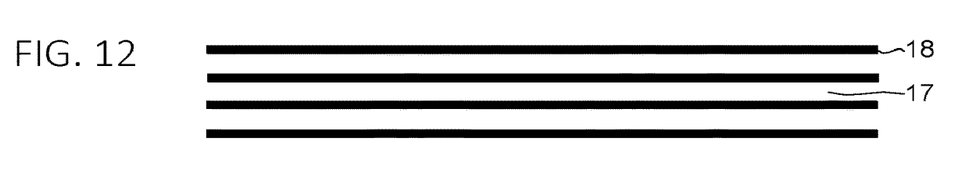
FIG. 12 is a view schematically illustrating a lower surface of a second example of the couplant illustrated in FIG. 9.
Figure 13:
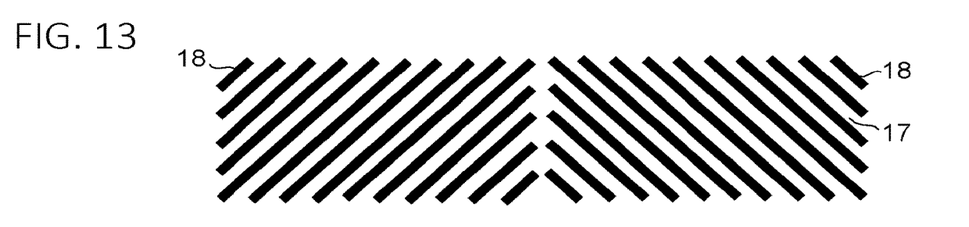
FIG. 13 is a view schematically illustrating a lower surface of a third example of the couplant illustrated in FIG. 9.

The planar shape of the uneven structure 12 of each of the couplants 4A, 4B may be a planar shape where only one of the vertical and horizontal bar-shaped projections 18 are arranged in parallel as illustrated in FIG. 12, or a planar shape where a pair of bar-shaped projections 18 are arranged at a predetermined angle as illustrated in FIG. 13, instead of the shape illustrated in FIG. 11. When the planar shape where the bar-shaped projections 18 are combined is formed by the protruding members 14, a thickness such as a diameter of the bar-shaped protruding member 14 is preferably smaller than $\frac{1}{5}$ of a wavelength of sound to be applied, which allows to prevent the protruding member 14 from inhibiting the propagation of acoustic waves. The composing material of the protruding member 14 preferably has excellent durability, such as resistance to friction. This is also true for the case where isolated protruding parts shown below are formed by the protruding member 14.

Figure 14:
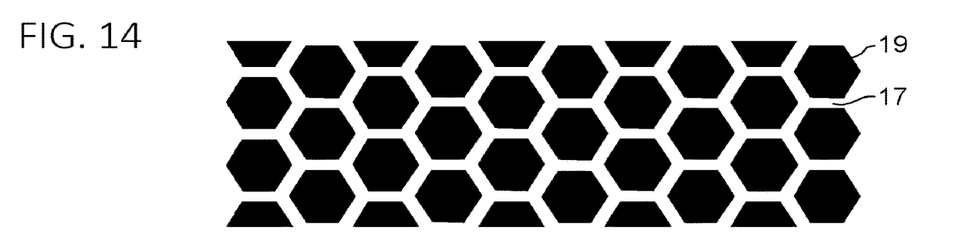
FIG. 14 is a view schematically illustrating a lower surface of a fourth example of the couplant illustrated in FIG. 9.
Figure 15:
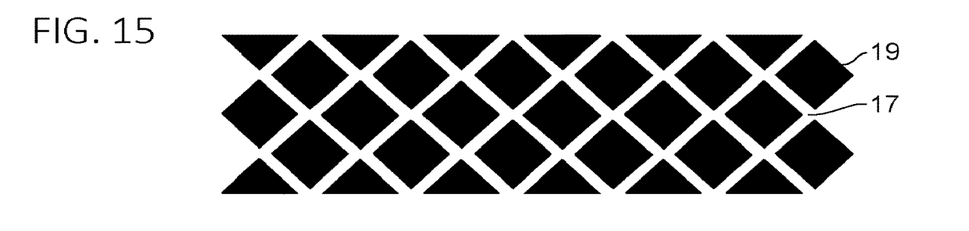
FIG. 15 is a view schematically illustrating a lower surface of a fifth example of the couplant illustrated in FIG. 9.

The planar shape of the uneven structure 12 of each of the couplants 4A, 4B may be a shape where a plurality of polygonal projections 19 are arranged as illustrated in FIG. 14 and FIG. 15, instead of the shape where a plurality of bar-shaped projections 18 are combined as illustrated in FIG. 11 through FIG. 13. FIG. 14 illustrates a planar shape with a plurality of hexagonal projections 19. FIG. 15 illustrates a planar shape with a plurality of quadrangle (square) projections 19. The polygonal projections 19 are not limited to hexagons or quadrangles, and the number of sides n of the polygon is not particularly limited. Concrete polygons include polygons with the number of sides n of three or more and eight or less. In this case, each side of the polygon is not limited to a straight line, but may also be curved. The shape of the isolated projections 19 may be a shape formed by a curve or curves, such as a circle or an oval shape. A cross-sectional shape of each of the projections 18 and 19 may be circular or rectangular.

Figure 16:
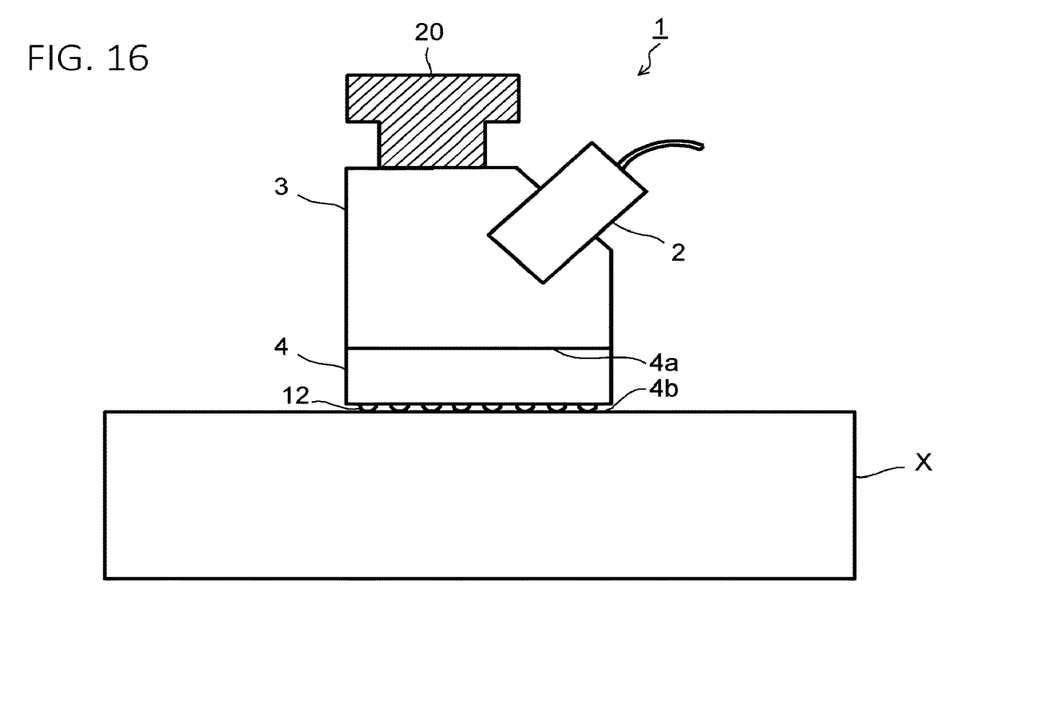
FIG. 16 is a cross-sectional view illustrating a first modification example of the acoustic inspection device of an embodiment.
Figure 17:
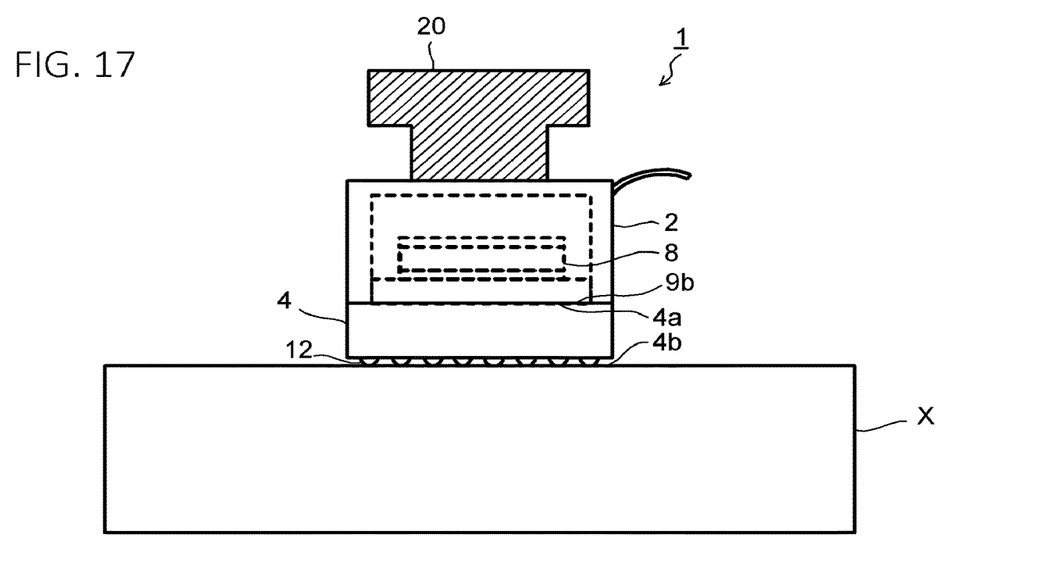
FIG. 17 is a cross-sectional view illustrating a second modification example of the acoustic inspection device of an embodiment.

A mechanism of applying the load to the couplant 4 is not limited to the mechanism of applying the load through the load-applying fixture 5 as illustrated in FIG. 1. For example, as illustrated in FIG. 16, a pressure-applying member 20 of a mechanical, hydraulic, pneumatic, electromagnetic or other actuator may be thrust against the shoe 3, and a load may be applied directly from the pressure-applying member 20 to the shoe 3, to thereby apply the load to the couplant 4. As illustrated in FIG. 17, when the couplant 4 is provided directly on the acoustic function surface 9b of the acoustic probe 2 without an intermediate member such as the shoe 3, the pressure-applying member 20 of the actuator may be thrust against the acoustic probe 2 to apply the load to the couplant 4. The loading mechanism for the couplant 4 is required to be switchable between a state where the load is applied to the couplant 4 and a state where the load is removed, and a concrete method of applying the load, shape of the applying member, and the like are not particularly limited.

EXAMPLES

Hereinafter, examples and their evaluation results will be described.

Example 1 and Comparative Example 1

First, several elastomeric sheets with the Young's modulus of 0.1 to 10 MPa and a thickness of 2 mm were prepared. Next, five types of nylon meshes (supplied by Co., Ltd. Kurebaa CLEVER, an aperture of 59 to 200 μm, and a wire diameter of 60 to 100 μm) were prepared. The mesh was placed on the elastomeric sheet, and a weight was further placed thereon. The resultant was heated at 120° C. for 20 minutes in a nitrogen atmosphere and brought the nylon mesh into close contact with the elastomeric sheet by bringing back to room temperature. A surface of the elastomeric sheet, where the mesh was not attached, was attached to a surface (a transmitting-receiving surface of ultrasonic waves) of an ultrasonic transducer with a frequency of 3.5 MHz. As illustrated in FIG. 17, a plurality of ultrasonic inspection devices were each fabricated by attaching an electromagnetic actuator to the ultrasonic transducer.

Movement properties of the acoustic inspection devices described above were evaluated. First, a shear tensile test was performed to determine if the acoustic inspection device (ultrasonic transducer) could be moved under its own weight alone and with no further load applied. The ultrasonic transducer was connected to a load cell and placed on a stainless steel plate with a surface roughness of 18 μm, the stainless steel plate was moved at low speed to measure a static friction coefficient. As comparative examples, measurements were also performed only on the elastomeric sheets without the mesh attached. As a result, it was found that for all the elastomers, it was difficult to move the transducer without the mesh because of the extremely large static friction coefficient, but when the mesh was attached, the static friction coefficient became small without any exceptions, and it was possible to move the transducer. The results are listed in Table 1.

Next, an ultrasonic flaw detection test was performed. A 300 mm long carbon steel block was prepared. The surface roughness Rz of a surface to which ultrasonic waves were incident was set as 18 μm, and the surface roughness Rz of a surface to which the ultrasonic waves were bounced back was set as 1.6 μm. The flaw detection test was performed under conditions where an electromagnetic actuator was used to apply a load of 0.15 MPa to the ultrasonic probe, which was pressed against the carbon steel block. The results are listed in Table 1 together with the results of the friction coefficient. The larger the aperture of the mesh was, the better because an amplitude of a reflected wave waveform became larger. As the Young's modulus of the elastomer increased to 10 MPa or more, the amplitude of the reflected wave waveform became smaller and the ultrasonic flaw detection became difficult. An elastomer mixed with polyrotaxane, which was the slide-ring elastomer, was found to be a suitable couplant for the ultrasonic inspection due to its low Young's modulus and low hysteresis. In Table 1, Sample numbers 2 to 9, 11 to 15, and 17 to 21 are examples, and Sample numbers 1, 10, 16 are comparative examples.

18 μm, the stainless steel plate was moved at low speed to measure a static friction coefficient. As a comparative example, measurement was also performed only on an elastomeric sheet without an uneven structure. As a result, it was found that for all the elastomers, it was difficult to move the probe when the uneven structure was not formed because of the extremely large static friction coefficient, but when the uneven structure was formed, the static friction coefficient became small without any exceptions, and it was possible to move the probe. The results are listed in Table 2.

Next, an acoustic flaw detection test was performed. A 300 mm long carbon steel block was prepared. The surface roughness Rz of a surface to which acoustic waves were incident was set as 18 μm, and the surface roughness Rz of a surface to which the acoustic waves were bounced back was set as 1.6 μm. The flaw detection test was performed under conditions where a hydraulic actuator was used to apply a load of 0.2 MPa to the ultrasonic transducer, which was pressed against the carbon steel block. The results are listed in Table 2 together with the results of the friction coefficient. An amplitude of a reflected wave waveform was large due to the uneven shape, and the result was good. In Table 2, Sample numbers 22 to 29 are examples, and sample number 30 is a comparative example.

TABLE 1

[Example 1 and Comparative example 1]

| | Elastomer | | Mesh material | | | Amplitude of |
|---|---|---|---|---|---|---|
| Sample number | Type | Young's modulus [MPa] | Wire diameter [μm] | Aperture [μm] | Friction coefficient | reflected wave waveform [V] |
| 1 | Styrene | 0.4 | — | — | 0.90 | 0.59 |
| 2 | butadiene | 0.4 | 60 | 59 | 0.40 | 0.32 |
| 3 | elastomer | 0.4 | 70 | 77 | 0.49 | 0.36 |
| 4 | (rubber) | 0.4 | 68 | 108 | 0.48 | 0.40 |
| 5 | | 0.4 | 91 | 132 | 0.35 | 0.40 |
| 6 | | 0.4 | 100 | 200 | 0.38 | 0.41 |
| 7 | | 5 | 100 | 200 | 0.38 | 0.27 |
| 8 | | 10 | 100 | 200 | 0.38 | 0.10 |
| 9 | | 12 | 100 | 200 | 0.38 | 0.00 |
| 10 | Polyurethane | 0.4 | — | — | 4.7 | 0.61 |
| 11 | elastomer | 0.4 | 60 | 59 | 0.58 | 0.35 |
| 12 | | 0.4 | 70 | 77 | 0.48 | 0.32 |
| 13 | | 0.4 | 68 | 108 | 0.49 | 038 |
| 14 | | 0.4 | 91 | 132 | 0.50 | 0.40 |
| 15 | | 0.4 | 100 | 200 | 0.40 | 0.41 |
| 16 | Polyurethane | 0.1 | — | — | 5.0 | 0.58 |
| 17 | elastomer + | 0.1 | 60 | 59 | 0.52 | 0.45 |
| 18 | Polyrotaxane | 0.1 | 70 | 77 | 0.47 | 0.46 |
| 19 | | 0.1 | 68 | 108 | 0.45 | 0.46 |
| 20 | | 0.1 | 91 | 132 | 0.50 | 0.48 |
| 21 | | 0.1 | 100 | 200 | 0.52 | 0.50 |

Example 2 and Comparative Example 2

Molds for forming the couplants illustrated in FIG. 5, FIG. 6, and FIG. 11 to FIG. 15 were prepared. Sizes and shapes are as listed in Table 2. Next, thermoplastic elastomers were prepared and poured into respective molds at high temperature to obtain couplants with desired uneven structures. The above-mentioned couplants were each attached to the shoe of the oblique ultrasonic probe illustrated in FIG. 16. The couplant was attached so that the uneven surface was located on the inspection target side. The frequency of the used ultrasonic probe was 2 MHz.

The movement properties of the ultrasonic inspection devices described above were evaluated. First, a shear tensile test was performed to determine if the acoustic inspection device (ultrasonic transducer) could be moved under its own weight alone and with no further load applied. The ultrasonic transducer was connected to a load cell and placed on a stainless steel plate with a surface roughness of

TABLE 2

[Example 2, Comparative example 2]

| | Elastomer | | Uneven structure | | | | Amplitude of |
|---|---|---|---|---|---|---|---|
| Sample number | Type | Young's modulus [MPa] | Cross-sectional shape | Planar shape | Size [μm] | Friction coefficient | reflected wave waveform [V] |
| 22 | Polyurethane elastomer | 1.2 | FIG. 5 | FIG. 13 | Protrusions: 300 Recesses: 10 | 0.52 | 0.20 |
| 23 | | 1.2 | FIG. 6 | FIG. 13 | Protrusions: 300 Recesses: 10 | 0.67 | 0.23 |
| 24 | | 1.5 | FIG. 5 | FIG. 12 | Protrusions: 300 Recess: 10 | 0.50 | 0.20 |

TABLE 2-continued

[Example 2, Comparative example 2]

| | Elastomer | | Uneven structure | | | | Amplitude of reflected wave waveform [V] |
|---|---|---|---|---|---|---|---|
| Sample number | Type | Young's modulus [MPa] | Cross-sectional shape | Planar shape | Size [μm] | Friction coefficient | |
| 25 | | 1.5 | FIG. 6 | FIG. 12 | Protrusions: 300 Recesses: 10 | 0.72 | 0.23 |
| 26 | | 0.9 | FIG. 5 | FIG. 14 | Sides of hexagons: 300 Recesses: 10 | 0.73 | 0.31 |
| 27 | | 0.9 | FIG. 6 | FIG. 14 | Sides of hexagons: 300 Recesses: 10 | 0.82 | 0.37 |
| 28 | | 1.5 | FIG. 5 | FIG. 15 | Sides of squares: 200 Recesses: 10 | 0.75 | 0.18 |
| 29 | | 1.5 | FIG. 6 | FIG. 15 | Sides of squares: 200 Recesses: 10 | 0.90 | 0.22 |
| 30 | | 0.4 | (None) | (None) | — | 4.7 | 0.61 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic inspection method, comprising:
a step of bringing an uneven surface of a couplant, which is provided directly or with an intermediate member therebetween on an acoustic function surface functioning as at least one of a transmitting surface and a receiving surface of acoustic waves of an acoustic transducer, which includes a piezoelectric element having at least one of functions of transmitting and receiving acoustic waves, into contact with an inspection target, wherein the couplant includes a couplant body containing an elastomer having a Young's modulus of 0.1 MPa or more and 10 MPa or less, and a plurality of protruding members provided only on a contact surface of the couplant body to form the uneven surface and having a Young's modulus higher than that of the couplant body;
a step of applying a load to the couplant and pressing the couplant against the inspection target by protruding out the couplant body from between the plurality of protruding members so that a part of the couplant body is appressed to the inspection target;
a step of performing a nondestructive inspection of the inspection target using acoustic waves under a state of pressing the part of the couplant body against the inspection target;
a step of removing the load; and
a step of moving the couplant provided at the acoustic transducer, from which the load is removed, along the inspection target under, wherein
the nondestructive inspection is conducted by propagating the acoustic wave through an appressed portion of the couplant body to the inspection target.

2. The acoustic inspection method according to claim 1, wherein the couplant provided at the acoustic transducer is moved under a state where the appressed portion of the couplant is brought into contact with the inspection target.

3. A couplant, comprising:
a couplant body containing an elastomer having a Young's modulus of 0.1 MPa or more and 10 MPa or less; and
a plurality of protruding members provided only on a contact surface of the couplant body and having a Young's modulus higher than that of the couplant body to form an uneven structure to the couplant body, wherein
the couplant body has a contact surface to be in contact with an inspection target
the couplant body is configured to appress a part of the contact surface to the inspection target by protruding out the couplant body from between the plurality of protruding members with an load applied to the couplant.

4. The couplant according to claim 3, wherein
a minimum width of the plurality of protruding members is 10 μm or more and 500 μm or less and a minimum width of recessed portions in the uneven structure is 10 μm or more and 500 μm or less, and
a total area of planar shapes of the recessed portions is larger than a total area of planar shapes of the protruding members, when viewed from a normal direction of the contact surface.

5. An acoustic inspection device, comprising:
an acoustic transducer which includes a piezoelectric element having at least one of functions of transmitting and receiving acoustic waves and has an acoustic function surface functioning as at least one of a transmitting surface and a receiving surface of acoustic waves;
a couplant, which is provided directly or with an intermediate member therebetween on the acoustic function surface of the acoustic transducer, and including a couplant body containing an elastomer having a Young's modulus of 0.1 MPa or more and 10 MPa or less and having a contact surface to be in contact with an inspection target, and a plurality of protruding members provided only on the contact surface of the couplant body and having a Young's modulus higher than that of the couplant body, to form and an uneven structure on the contact surface; and a loading mechanism which applies and removes a load to/from the couplant, the load being applied so that a part of the couplant body protrudes out between the plurality of protruding members and a protruded part of the couplant body is appressed to the inspection target, wherein the acoustic wave for the acoustic inspection is propagated through an appressed part of the couplant body to the inspection target.

6. The acoustic inspection device according to claim 5, wherein the piezoelectric element is an ultrasonic transmitting-receiving piezoelectric element or a sonic transmitting-receiving piezoelectric element.

7. The acoustic inspection device according to claim 5, wherein the elastomer includes at least one selected from the group consisting of polystyrene-based thermoplastic elastomer, styrene-butadiene rubber, isoprene rubber, butadiene rubber, chloroprene rubber, acrylonitrile-butadiene rubber, isobutylene-isoprene rubber, ethylene-propylene rubber, ethylene-propylene-diene rubber, silicone rubber, fluorine rubber, chlorosulfonated polyethylene, acrylic rubber, and epichlorohydrin rubber.

8. The acoustic inspection device according to claim 5, wherein the protruding members comprise a nylon mesh.

9. The acoustic inspection device according to claim 5, wherein the plurality of protruding members have a shape of mesh, or each of the plurality of protruding members has a shape of a bar, a circle, or a polygon, when viewed from a normal direction of the contact surface.

10. The couplant according to claim 3, wherein the plurality of protruding members have a shape of mesh, or each of the plurality of protruding members has a shape of a bar, a circle, or a polygon, when viewed from a normal direction of the contact surface.

11. The couplant according to claim 3, wherein the elastomer includes at least one selected from the group consisting of polystyrene-based thermoplastic elastomers, styrene-butadiene rubber, isoprene rubber, butadiene rubber, chloroprene rubber, acrylonitrile-butadiene rubber, isobutylene-isoprene rubber, ethylene-propylene rubber, ethylene-propylene-diene rubber, silicone rubber, fluorine rubber, chlorosulfonated polyethylene, acrylic rubber, and epichlorohydrin rubber.

12. The couplant according to claim 10, wherein the protruding members comprise a nylon mesh.

* * * * *